June 21, 1938. K. M. ALM Re. 20,765

SHAVING APPARATUS

Original Filed April 23, 1934

INVENTOR;
KARL MARTIN ALM
BY Nelles L. Church
ATTORNEY

Reissued June 21, 1938

Re. 20,765

UNITED STATES PATENT OFFICE 20,765

SHAVING APPARATUS

Karl Martin Alm, Stockholm, Sweden, assignor to Loyd Scruggs, University City, Mo.

Original No. 2,012,703, dated August 27, 1935, Serial No. 721,860, April 23, 1934. Application for reissue July 22, 1937, Serial No. 154,939. In Sweden April 25, 1933

10 Claims. (Cl. 30—43)

This invention relates to shaving apparatus of the kind provided with a movable razor blade abutting against and cooperating with a protective comb constituting a stationary cutter, and disposed so as to bear against and come in direct contact with the skin during the shaving operation. Said movable blade is made very thin and substantially flat and it is provided with a substantially wave-shaped edge made up of a plurality of cutting teeth separated from each other by relatively wide gaps or spaces. During the shaving operation said movable blade abuts directly against the skin, thereby causing portions of the skin to protrude inwardly through the gaps in the edge portion of the blade and come in contact with the protective comb, and the movement of said blade relatively to said protective comb causes the cutting teeth of the blade to coact with shearing teeth or cutting edges on the comb to sever the hair or whiskers flush with the surface of the skin.

To insure that shaving with such an apparatus can be carried out efficiently and without any danger of injuring the skin, the teeth of the protective comb must be very thin and in addition be arranged very closely together so that the skin which protrudes inwardly through the gaps in the edge of the movable blade, cannot enter or substantially enter the spaces between said teeth. According to the invention this is effected by making the protective comb consist of a number of thin plates, segments or the like rigidly secured together, and maintained in definite mutual distances apart, so as to form teeth of the comb, by means of very thin or narrow distance holders arranged between said comb teeth.

According to one embodiment of the invention, said distance holders consist of separate parts secured to the comb teeth by soldering, welding or in some other suitable way.

According to a second embodiment of the invention, the distance holders consist of solder material or the like, which partly fills up the intermediary space between the comb teeth. In this case the comb teeth are kept apart during the soldering operation by means of removable distance pieces consisting for example of paper or the like.

According to a third embodiment of the invention, the distance holders may consist of shoulders, projections, enlargements or the like integral with the comb teeth. Irrespective of the method employed to construct the protective comb, it is essential that the spaces between the teeth of said comb be narrow enough to substantially exclude the skin for if it were possible for the skin to enter said spaces, the skin would be cut by the movable blade which reciprocates relatively to the teeth of the protective comb.

The invention is illustrated by way of example on the accompanying drawing.

Fig. 1 shows a cross-section through an embodiment of the shaving apparatus. Fig. 2 is a plan view of a part of the same seen from below. Fig. 3 is a section along the line III—III in Fig. 1. Fig. 4 shows a detail view of a comb tooth, and Fig. 5 a detail view of a distance holder.

Figure 2:
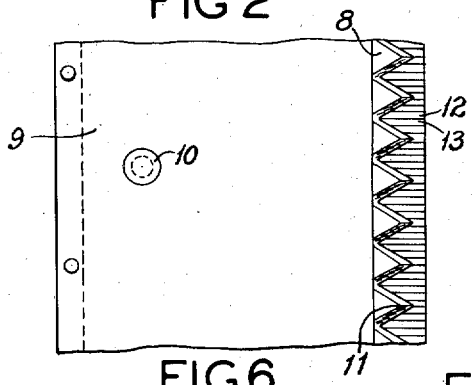
Figure 3:
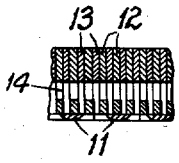

In the machine frame 1, the driving shaft 2 is pivotally journalled and is provided with a crank pin 3, which carries a roller 4. Said roller projects between two flanges or guide bars 5, which project upwards from the member 6 that is connected to the razor blade 8 by means of pins 7 or the like. The razor blade is on its underside partially covered by a plate 9 secured to the frame 1 by means of a screw 10. The edge portion of the blade 8 that projects laterally beyond the edge of the plate 9 is made substantially wave-shaped so as to provide a plurality of cutting teeth 11 separated from each other by relatively wide V-shaped gaps or spaces. The top sides of said cutting teeth 11 that come in contact with the skin are preferably beveled as shown in Figs. 2 and 3, so as to produce sharp cutting edges that will glide easily over the skin. The razor blade is given a reciprocating motion by means of the rotating shaft 2, the crank pin 3 and the member 6.

Figure 1:
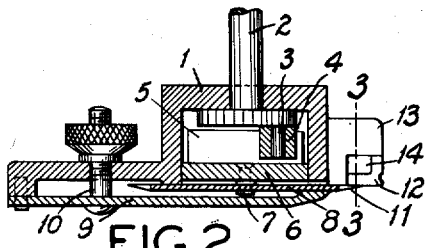
Figure 4:
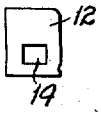
Figure 5:
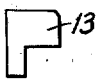
Figure 6:
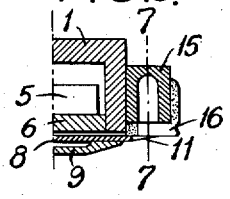
Fig. 6 is a cross-section through a part of a somewhat modified shaving apparatus.
Figure 7:
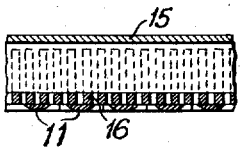
Fig. 7 is a section along the line VII—VII in Fig. 6.
Figure 8:
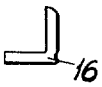
Fig. 8 shows an embodiment of the comb teeth, and Fig. 9 a holder for the latter.
Figure 9:
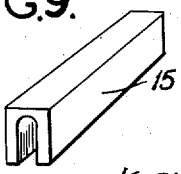

The cutting teeth 11 of the razor blade 8 that project outside of or beyond the edge of the plate 9, abut tightly against the bottom side of a protective comb that is secured to the frame and which is of such construction that the skin which protrudes inwardly through the gaps in the edge of the blade 8 cannot enter or substantially enter the spaces between the teeth of said comb. Said protective comb consists of vertical thin comb plates 12 (Fig. 4), and thin distance holders 13 of the kind illustrated in Figs. 1 and 5 and arranged between the comb plates. The latter may, if desired, be provided with an opening 14, said openings forming together a channel extended throughout the protective comb, through which channel the hair that has been cut off can be removed. The distance holders 13 may be made of any suitable material, for example sheet metal, and they may be secured to the frame 1 together with the comb-plates 12 by means of soldering, welding or similar operation.

In the embodiment according to Figs. 6–9, the shaving apparatus is provided with a protective comb consisting of a substantially channel-shaped holder 15 and L-shaped comb plates 16 secured to said holders at definite mutual distances apart. Said comb plates may suitably be attached to the holder 15 by soldering, in which case the solder material is allowed to partly fill up the intermediary space between the plates 16, as indicated as at spots hatched by dots in Fig. 6. Before the soldering operation, the comb plates may be kept apart at the desired mutual distances by means of removable distance members, for example of paper, which are inserted between the plates at those spots, which are to be free from each other. In this embodiment of the invention, the comb plates 16 may, of course, also be maintained apart at the desired mutual distances by means of intermediate plates which together with the comb plates are to be attached to the holder 15.

The invention can of course be applied to the most different kinds of shaving apparatus. Thus, for example, the movable cutting blade may be of varying shapes, its movements may be rotary. The plates of the comb and the distance holders may vary considerably with regard to shape and the manner in which they are secured together, respectively attached to the machine frame.

Having now particularly described the nature of my invention and the manner of its operation, what I claim is:

1. A shaving apparatus comprising a housing, a substantially flat razor blade movably arranged in said housing and adapted to abut against the skin when shaving, a protective comb secured to the outside of said housing and provided with spaced shearing teeth substantially perpendicular to and abutting against the side of the razor blade turned away from the skin, means for imparting a motion to the razor blade across the shearing edges of said shearing teeth, which consist of thin plates that are rigidly secured together and spaced at definite mutual distances by means of distance holders arranged between the teeth.

2. A shaving apparatus comprising a housing, a substantially flat razor blade movably arranged in said housing and adapted to abut against the skin when shaving, a protective comb secured to the outside of said housing and provided with spaced shearing teeth substantially perpendicular to and abutting against the side of the razor blade turned away from the skin, means for imparting a motion to the razor blade across the shearing edges of said shearing teeth, which consist of thin plates that are rigidly secured together and spaced at definite mutual distances by means of distance holders consisting of separate parts attached to and between the teeth.

3. A shaving apparatus comprising a housing, a substantially flat razor blade movably arranged in said housing and adapted to abut against the skin when shaving, a protective comb secured to the outside of said housing and provided with spaced shearing teeth substantially perpendicular to and abutting against the side of the razor blade turned away from the skin, means for imparting a motion to the razor blade across the shearing edges of said shearing teeth, which consist of thin plates that are rigidly secured together, and spaced at definite mutual distances by means of distance holders consisting of separate parts attached to and between the teeth by soldering.

4. A shaving apparatus comprising a housing, a substantially flat razor blade movably arranged in said housing and adapted to abut against the skin when shaving, a protective comb secured to the outside of said housing and provided with spaced shearing teeth substantially perpendicular to and abutting against the side of the razor blade turned away from the skin, means for imparting a motion to the razor blade across the shearing edges of said shearing teeth, which consist of thin plates that are rigidly secured together and spaced at definite mutual distances by means of distance holders consisting of solder material, which partly fills up the spaces between the teeth.

5. A shaving apparatus comprising a movable blade adapted to abut against the skin when shaving and provided with a plurality of cutting teeth separated by gaps of such width that the skin can protrude through same during shaving, and a protective comb provided with cutting edges adapted to coact with the cutting teeth on said movable blade and disposed in abutting relationship with the side of said movable blade turned away from the skin when the apparatus is in use, the cutting edges on said comb being separated by spaces which are too narrow to permit the skin to enter or substantially enter same during the shaving operation.

6. A shaving apparatus of the kind described in claim 5 in which the top sides of the cutting teeth of the movable blade that contact with the skin are beveled.

7. A shaving apparatus comprising a movable substantially flat blade arranged so that one side of same will bear against the skin during the shaving operation and provided with cutting teeth separated from each other by substantially V-shaped gaps or spaces of a size sufficient to permit portions of the skin to protrude into said gaps, and a protective comb in contact with the other side of said blade, constructed so as to substantially exclude the skin during the shaving operation and provided with shearing teeth that coact with the cutting teeth on said movable blade.

8. A shaving apparatus comprising a stationary cutter provided with shearing teeth separated by slots of a width sufficient to substantially exclude the skin during the shaving operation, but wide enough to receive the hairs or whiskers on the skin, and a movable blade mounted on the top of said stationary cutter and provided with a substantially wave-shaped cutting edge that abuts directly against the skin and causes the skin to be forced inwardly through gaps in said blade and pressed against said stationary cutter during the shaving operation.

9. In a shaving apparatus, the combination of a frame, a stationary protective comb carried by said frame and provided with a plurality of cutting edges separated by slots that are too narrow to receive or substantially receive the skin during the shaving operation, but which are wide enough to receive the hair or whiskers on the skin, a movable blade arranged in superimposed relationship with said protective comb and adapted to bear directly against the skin, said movable blade having gaps of a width sufficient to permit the skin to protrude through the same and contact with said comb, and means carried by said frame for reciprocating said blade.

10. A shaving apparatus of the kind described in claim 8 in which the movable blade has cutting teeth that are beveled on their top sides.

KARL MARTIN ALM.